US008126062B2

(12) United States Patent
Tian et al.

(10) Patent No.: US 8,126,062 B2
(45) Date of Patent: Feb. 28, 2012

(54) PER MULTI-BLOCK PARTITION BREAKPOINT DETERMINING FOR HYBRID VARIABLE LENGTH CODING

(75) Inventors: Dihong Tian, San Jose, CA (US); Wen-hsiung Chen, Sunnyvale, CA (US); Pi Sheng Chang, San Jose, CA (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1384 days.

(21) Appl. No.: 11/686,860

(22) Filed: Mar. 15, 2007

(65) Prior Publication Data

US 2008/0181296 A1 Jul. 31, 2008

Related U.S. Application Data

(60) Provisional application No. 60/885,075, filed on Jan. 16, 2007.

(51) Int. Cl.
*H04N 7/12* (2006.01)
(52) U.S. Cl. .................. 375/240.26; 380/218; 382/246
(58) Field of Classification Search .................. 382/244, 382/247; 380/218
See application file for complete search history.

(56) References Cited

U.S. PATENT DOCUMENTS

| 4,698,672 | A | 10/1987 | Chen et al. ............ 358/136 |
|---|---|---|---|
| 4,821,119 | A | 4/1989 | Gharavi ............ 375/240.16 |
| 5,640,420 | A | 6/1997 | Jung ............ 375/240 |
| 5,751,232 | A | 5/1998 | Inoue et al. ............ 341/63 |
| 6,658,157 | B1 * | 12/2003 | Satoh et al. ............ 382/239 |
| 7,203,372 | B1 | 4/2007 | Chen et al. ............ 382/244 |
| 7,212,681 | B1 | 5/2007 | Chen et al ............ 382/248 |
| 7,242,328 | B1 | 7/2007 | Chen et al. | |
| 7,881,543 | B2 * | 2/2011 | Okada et al. ............ 382/232 |
| 2002/0136307 | A1 * | 9/2002 | Imura et al. ............ 375/240.24 |
| 2003/0133510 | A1 * | 7/2003 | Nishikawa et al. ...... 375/240.26 |
| 2004/0228540 | A1 | 11/2004 | Chen et al. ............ 382/246 |
| 2005/0013376 | A1 | 1/2005 | Dattani et al. | |
| 2005/0276487 | A1 * | 12/2005 | Chen et al. ............ 382/232 |
| 2005/0276497 | A1 | 12/2005 | Chen et al. ............ 382/245 |
| 2005/0276498 | A1 | 12/2005 | Chen et al. ............ 382/245 |
| 2005/0276499 | A1 | 12/2005 | Wu et al. ............ 382/245 |

(Continued)

OTHER PUBLICATIONS

Cuenca et al., "Breakpoint Tuning in DCT-Based Nonlinear Layered Video Codecs", 2004, EURASIP Journal on Applied Signal Processing, pp. 2555-2570.*
U.S. Appl. No. 11/686,898, filed Mar. 15, 2007.
U.S. Appl. No. 11/961,795, filed Dec. 20, 2007.

(Continued)

*Primary Examiner* — Matthew Smithers
(74) *Attorney, Agent, or Firm* — Dov Rosenfeld; Inventek

(57) ABSTRACT

A method, and apparatus, and logic encoded in one or more computer-readable tangible medium to carry out a method. The method is to code a plurality of ordered sequences of quantized transform coefficients of a corresponding plurality of blocks of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The plurality of blocks include adjacent blocks and form a multi-block partition. The breakpoint location is determined as a function of the sequences of the multi-block partition such that different multi-block partitions can have different breakpoints.

23 Claims, 9 Drawing Sheets

U.S. PATENT DOCUMENTS

| | | | |
|---|---|---|---|
| 2006/0039615 A1 | 2/2006 | Chen et al. | 382/232 |
| 2006/0039616 A1 | 2/2006 | Chen et al. | 382/232 |
| 2006/0039620 A1 | 2/2006 | Chen et al. | 382/245 |
| 2006/0039621 A1* | 2/2006 | Toebes et al. | 382/245 |
| 2006/0056720 A1 | 3/2006 | Chen et al. | 382/245 |
| 2007/0019877 A1 | 1/2007 | Chen et al. | 382/245 |

OTHER PUBLICATIONS

U.S. Appl. No. 11/686,778, filed Mar. 15, 2007.

U.S. Appl. No. 11/686,778, filed Mar. 15, 2007, Office Action Mailing Date Sep. 1, 2010.

* cited by examiner

| Freq. index: | 1 | 2 | 3 | 4 | 5 | 6 | 7 | 8 | 9 | 10 | 11 | 12 | 13 | 14 | 15 | 16 | ... | 63 |
|---|---|---|---|---|---|---|---|---|---|---|---|---|---|---|---|---|---|---|
| Coefficients: | 0 | 8 | 5 | 0 | 2 | 3 | 2 | 0 | 0 | 0 | 1 | 1 | 0 | 0 | 1 | 0 | ... | 0 |

FIG. 5A

| Freq. index: | 1 | 2 | 3 | 4 | 5 | 6 | 7 | 8 | 9 | 10 | 11 | 12 | 13 | 14 | 15 | 16 | ... | 63 |
|---|---|---|---|---|---|---|---|---|---|---|---|---|---|---|---|---|---|---|
| Coefficients: | 0 | 7 | 5 | 4 | 2 | 0 | 2 | 1 | 1 | 0 | 0 | 1 | 1 | 0 | 0 | 0 | ... | 0 |

FIG. 5B

Table 1A

| Possible ending event | Event Index | Starting position | Ending position | Num. of bits |
|---|---|---|---|---|
| N/A | 0 | 0 | 0 | $nbits_1(0)$ |
| 0 8 5 0 | 1 | 1 | 4 | $nbits_1(4)$ |
| 2 3 2 0 | 2 | 5 | 8 | $nbits_1(8)$ |
| 0 0 1 1 0 | 3 | 9 | 13 | $nbits_1(13)$ |
| 0 1 0 | 4 | 14 | 16 | $nbits_1(16)$ |

FIG. 6A

Table 1B

| Possible ending event | Event Index | Starting position | Ending position | Num. of bits |
|---|---|---|---|---|
| N/A | 0 | 0 | 0 | $nbits_2(0)$ |
| 0 7 5 4 2 0 | 1 | 1 | 6 | $nbits_2(6)$ |
| 2 1 1 0 | 2 | 7 | 10 | $nbits_2(10)$ |
| 0 1 1 0 | 3 | 11 | 14 | $nbits_2(14)$ |

FIG. 6B

Table 2 of potential events

| Index | Start | End (potential breakpoint) | Total num. of bits to encode partition | Total num. of bits (using equivalence) | Which table selects breakpoint |
|---|---|---|---|---|---|
| 0 | 0 | 0 | $nbits_1(0)+nbits_2(0)$ | $nbits_1(0)+nbits_2(0)$ | Both |
| 1 | 1 | 4 | $nbits_1(4)+nbits_2(4)$ | $nbits_1(4)+nbits_2(6)$ | Table 1 |
| 2 | 5 | 6 | $nbits_1(6)+nbits_2(6)$ | $nbits_1(8)+nbits_2(6)$ | Table 2 |
| 3 | 7 | 8 | $nbits_1(8)+nbits_2(8)$ | $nbits_1(8)+nbits_2(10)$ | Table 1 |
| 4 | 9 | 10 | $nbits_1(10)+nbits_2(10)$ | $nbits_1(13)+nbits_2(10)$ | Table 1 |
| 5 | 11 | 13 | $nbits_1(13)+nbits_2(13)$ | $nbits_1(13)+nbits_2(14)$ | Table 1 |
| 6 | 14 | 16 | $nbits_1(14)+nbits_2(14)$ | $nbits_1(16)+nbits_2(14)$ | Table 2 |

FIG. 7

PER MULTI-BLOCK PARTITION BREAKPOINT DETERMINING FOR HYBRID VARIABLE LENGTH CODING

RELATED PATENT APPLICATIONS

The present invention claims priority of and is a conversion of U.S. Provisional Patent Application No. 60/885,075 filed Jan. 16, 2007 to inventors Tian et al., titled Breakpoint Determining for Hybrid Variable Length Coding. The contents of such U.S. Application No. 60/885,075 are incorporated herein by reference.

The present invention is also related to concurrently filed U.S. application Ser. No. 11/686,778 to inventors Tian et al. titled PER BLOCK BREAKPOINT DETERMINING FOR HYBRID VARIABLE LENGTH CODING, referred to as the Per Block Breakpoint Determining Patent Application hereinafter, discloses breakpoint determining methods called "per block breakpoint determining methods" herein. The present invention is also related to concurrently filed U.S. application Ser. No. 11/686,898 to inventors Tian et al. titled BREAKPOINT DETERMINING FOR HYBRID VARIABLE LENGTH CODING USING RELATIONSHIP TO NEIGHBORING BLOCKS. The contents of each such U.S. application are also incorporated herein by reference.

FIELD OF THE INVENTION

The present disclosure is related generally to image compression and video compression.

BACKGROUND

Modern transform-based image compression methods include transforming blocks of image data, quantizing the transform coefficients, then ordering the coefficients along a path in the two-dimensional coefficient plane, and entropy coding the ordered sequence of quantized coefficients. Quantization is such that 0 is the most-likely-to-occur coefficient amplitude. Conventional two-dimensional variable length coding is commonly used in image and video compression for the entropy coding, and includes coding the position of each non-zero-value coefficient and its amplitude simultaneously as a pair, which typically results in a shorter average code length than coding the position and amplitude separately. In a block-based transform coding, however, there are often a number of consecutive non-zero-value coefficients along a low-frequency region of the coding path. Instead of using a single code to represent the "n" consecutive coefficients, conventional two-dimensional variable length coding requires "n" separate codes, which is inefficient. Hybrid variable length coding was recently introduced and includes coding a first region in the ordered sequence—the low-frequency region—differently than the coefficients in a second higher-frequency region. One embodiment of hybrid variable length coding uses a low-frequency coding method that takes advantage of the clustered nature of the quantized non-zero coefficients in the low-frequency region and a high-frequency coding method that takes advantage of the scattered nature of the quantized non-zero coefficients in the high-frequency region.

The position along the sequence where the coding method changes the low-frequency region coding method to the high-frequency region coding method is called the "breakpoint." One aspect of hybrid variable length coding is determining the location of the breakpoint that separates the one, e.g., low-frequency region from the other, e.g., high-frequency region. Such a breakpoint must be known to a decoder to properly decode the coded coefficients. A constant breakpoint for an entire video sequence has been found to be not optimal.

The per block breakpoint determining methods disclosed in the Per Block Breakpoint Determining Patent Application determine breakpoint locations for use for each sequence of each block. Sending the information on the locations of the breakpoints requires some overhead. It may be that a single breakpoint location can be used for a multi-block partition, e.g., a partition of a small number of adjacent blocks. While not optimal, this may still provide improvement over sending a single breakpoint to use for all the blocks.

SUMMARY

Embodiments of the present invention include a method, and apparatus, and logic encoded in one or more computer-readable tangible medium to carry out a method. The method is to code a plurality of ordered sequences of quantized transform coefficients of a corresponding plurality of blocks of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The plurality of blocks include adjacent blocks and form a multi-block partition. The breakpoint location is determined as a function of the sequences of the multi-block partition such that different multi-block partitions can have different breakpoints.

Other embodiments include a method, and apparatus, and logic encoded in one or more computer-readable tangible medium to carry out a method. The method is to decode a bitstream comprising codewords encoded by a method to code a plurality of ordered sequences of quantized transform coefficients of a corresponding plurality of blocks of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The plurality of blocks includes adjacent blocks and form a multi-block partition. The breakpoint location is determined as a function of the sequences of the multi-block partition such that different multi-block partitions can have different breakpoints. The decoding method includes accepting the bitstream, recognizing codewords in the bitstream, and decoding the codewords in the bitstream.

One method embodiment includes a method comprising:

(a) for each ordered sequence of quantized transform coefficients of respective blocks of image data in a multi-block partition, determining a respective set of possible breakpoints, each possible breakpoint being the end of an ending event recognized by a selected low-frequency coding method that includes recognizing any event that includes a cluster of one or more quantized coefficients having amplitudes other than the most likely-to-occur amplitude, and for each possible breakpoint, determining the results of coding the ordered sequence of quantized transform coefficients of the image data of the block using a hybrid coding method that includes using the selected low-frequency coding method until the ending event and a selected high-frequency method to encode a part of the sequence starting from immediately after the ending event;

(b) for a plurality of the blocks, determining a set of potential breakpoints to use for all blocks of the plurality, and for each potential breakpoint, determining the sum of the results of coding the corresponding plurality of ordered sequences of quantized transform coefficients of the image data of the respective blocks in the plurality using the potential breakpoint, wherein each potential breakpoint is one of the possible breakpoints of the sets of breakpoints determined in (a) for the respective sequences of the blocks of the plurality, such that each potential breakpoint is defined by a corresponding ending event in one of the sequences of the blocks in a plurality of blocks;

(c) comparing the total number of bits that result in encoding the all sequences for the plurality of blocks using the potential breakpoints of the set determined in (b), and selecting as the single breakpoint the one potential breakpoint of the set determined in (b) that gives the minimum number of bits; and (d) encoding all the sequences of the plurality of blocks including for each sequence encoding a first portion of the sequence up to the selected single breakpoint using the selected low-frequency variable length coding method and a second portion of the sequence from the first coefficient after the selected single breakpoint to the end of the sequence using the selected high-frequency variable length coding method.

In one version, (a) includes determining for each respective set of possible breakpoints a corresponding data structure that includes for each possible breakpoint an indication of the location of the corresponding possible ending event that includes a cluster of one or more non-zero quantized coefficients. In one such version, (b) includes pairwise merging of data structures, including, for pairwise merging of two source data structure, repeating merging entries, one from each source data structure, until no entries remain to be merged, to form a so-far merged data structure, each merged entry of the so-far merged data structure including indications of a starting position and an ending position of potential breakpoints, wherein forming a merged entry of the so-far merged data structure from the next respective entries of the two source data structures includes using as the starting position the position immediately following the previous entry in the so-far merged data structure, and as the ending position the earliest ending position of the next entry from each source data structure, including, once the ending position of a particular entry of a particular source data structure is used, no longer using the particular entry of the particular source data for the merging.

One method further includes encoding an indication of the location of the final ending event.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

BRIEF DESCRIPTION OF THE DRAWINGS

FIG. 5A shows an example ordered sequence of AC coefficients after quantization of the first block of transformed image of FIG. 2A.

FIG. 5B shows an example ordered sequence of AC coefficients after quantization of the second block of transformed image of FIG. 2A.

FIG. 6A shows a data structure—in this case a table of possible breakpoint locations for the example sequence of FIG. 5A used to illustrate operation of an embodiment of the invention.

FIG. 6B shows a data structure—in this case a table of possible breakpoint locations for the example sequence of FIG. 5B used to illustrate operation of an embodiment of the invention.

FIG. 7 shows a merged data structure—in this case a table as a result of merging the example tables of FIGS. 6A and 6B using an embodiment of the present invention.

DESCRIPTION OF EXAMPLE EMBODIMENTS

Figure 1:
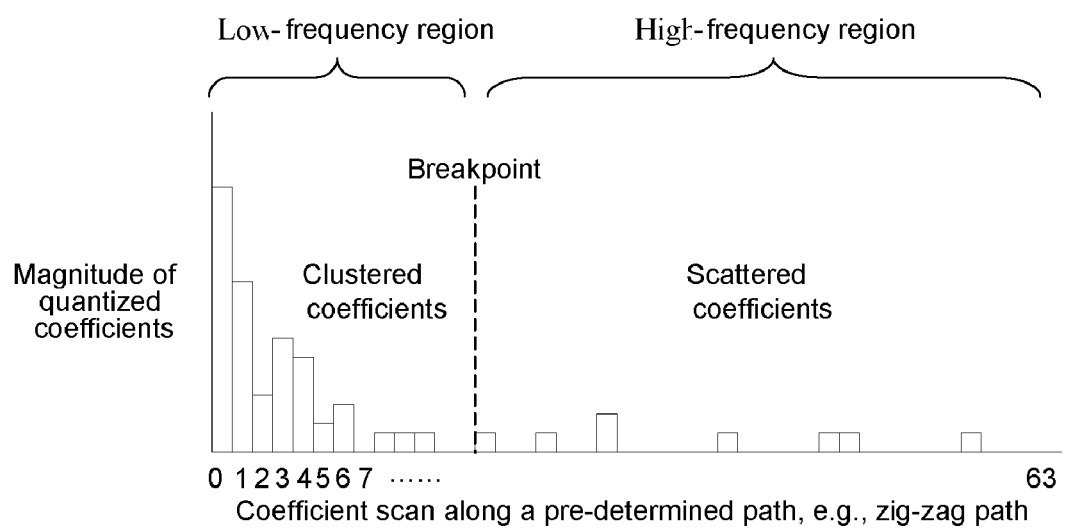
FIG. 1 shows a typical distribution of an ordered sequence of quantized coefficients of a transform block of image data.

In the description herein, it is assumed that a frame to be encoded is divided into blocks of image data. These blocks might be motion compensated, and a difference block might be determined after motion compensation. Each resulting block of image data is transformed by some transform, e.g., DCT or other transform. The coefficients are ordered, e.g., along the pre-determined path on the two-dimensional distribution, and then quantized. The description herein assumes that the quantization is to integer values that have sign and amplitude, and that zero is the most likely-to-occur amplitude, and 1 is the next most-likely-to-occur amplitude. Of course it is possible to quantize differently—the different quantized values are, after all, no more than labels that represent ranges of values. It would be straightforward for one in the art to modify the methods and techniques and apparatuses described herein to take into account other quantization schemes where zero is not the most likely-to-occur amplitude value, and/or 1 is not the next to most likely-to-occur amplitude value. The rest of this description therefore assumes, without loss of generality, that the ordered sequence of quantized coefficients has 0 as the most likely-to-occur amplitude value, and 1 as the next-to-most likely-to-occur amplitude value.

Conventional two-dimensional (2D) variable length coding (VLC), commonly adopted in image and video compression, is based on a run and amplitude level representation of an ordered sequence of quantized transform coefficients determined by ordering the coefficients along a pre-defined path, e.g., zigzag path for an N×N coefficient block. Such ordering is from low-frequency to high-frequency. Conventional two-dimensional variable length coding is therefore referred to as run-amplitude level variable length coding herein. Run-amplitude level variable length coding includes collecting or assuming statistics of non-zero coefficient amplitudes and of the number of zero-valued coefficients—the run-length of zeros that precede any non-zero amplitudes along the ordering of the sequence. A two-dimensional table consisting of the amplitude and the run-length is then constructed, and optimal variable length codes such as Huffman codes are assigned to represent the events in the table.

The advantage of run-amplitude level variable length coding is that the position of each non-zero-value coefficient and its amplitude are coded simultaneously as a pair, which results in a shorter average code length than coding the position and amplitude separately. In block-based transform coding, however, there are often a number of consecutive non-zero-value coefficients along the lower frequency region of the ordering of the sequence. Instead of using a single code to represent the "n" consecutive coefficients, run-amplitude level variable length coding requires "n" separate codes, which is inefficient. Hybrid variable length coding is known, and overcomes this deficiency. See, for example, U.S. patent application Ser. No. 10/869,229, filed 15 Jun. 2004 to inventors Chen, et al., published as US 20050276487, and titled "A HYBRID VARIABLE LENGTH CODING METHOD FOR LOW BIT RATE VIDEO CODING." The elements disclosed therein are referred to collectively and individually herein as the "Basic Hybrid VLCMethod." See also U.S. patent application Ser. No. 10/898,654, filed 22 Jul. 2004 to inventors Chen, et al., published as US 20050276497, and titled "AN EXTENDED HYBRID VARIABLE LENGTH CODING METHOD FOR LOW BIT RATE VIDEO CODING." The elements disclosed in U.S. Ser. No. 10/898,654 are referred to collectively and individually as the "Extended Hybrid VLC Method" herein. See also U.S. patent application Ser. No. 10/922,508, filed 18 Aug. 2004 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION." The elements disclosed in U.S. Ser. No. 10/922,508 are referred to collectively and individually as the "2-D Non-Zero/Zero Cluster VLC Method" herein.

Hybrid coding can be extended to include more than two regions. However, for the remainder of this description, when speaking of a first and second region, it is assumed that there are two regions with a single breakpoint. The breakpoint determining is for this region between the first (low-frequency) region and the second (high-frequency) region.

FIG. 1 shows a typical distribution of an ordered sequence of quantized coefficients of a transform block of image data. As depicted in FIG. 1, the quantized non-zero coefficients in the low-frequency are likely to be more clustered than in the high-frequency region where non-zero coefficients are likely to be scattered. One embodiment of hybrid variable length coding uses coding methods that respectively take advantage of the clustered nature of the coefficients in the low-frequency region and the scattered nature of the quantized non-zero coefficients in the high-frequency region. In one embodiment, hybrid variable length coding uses two types of position coding schemes. In one embodiment of hybrid variable length coding, in the low-frequency region, runs of consecutive zero-valued coefficients and runs of consecutive non-zero-valued coefficients are coded as a pair using a two-dimensional variable length coding table. In one embodiment of hybrid variable length coding, the amplitudes of the non-zero-valued coefficients are then coded by an independent, one-dimensional variable length coding table. In the high-frequency region, run-amplitude level variable length coding or a similar two-dimensional variable length coding scheme is retained to code the position and amplitude of each non-zero-valued coefficient as a pair.

The switching position between the low-frequency and high-frequency coding schemes is termed a "breakpoint", which must be known to the decoder to properly decode the coefficients. Determining or pre-selecting a breakpoint is required for the coding using hybrid variable length coding, and how this is determined can make a difference to the achieved coding efficiency. On one hand, given the low-frequency and high-frequency coding schemes, there exists an optimal breakpoint within each block of coefficients, which results in the minimum number of bits in the coded coefficients. On the other hand, this optimal breakpoint varies among blocks and therefore needs to be included in the bitstream, which may introduce a considerable overhead if it is not efficiently coded. We have studied hybrid variable length coding using a constant breakpoint for the entire video sequence, and found that a single constant breakpoint, while leading to reasonable performance, is not optimal.

Different methods and approaches are described herein for performing hybrid variable length coding with variable breakpoints. These approaches generally include two elements: a method to find a proper breakpoint for at least one block of coefficients, and a method to code the breakpoint in an explicit or implicit fashion. The details of different embodiments of these approaches are described herein below.

In the remainder of this description, unless otherwise noted, it is assumed that a method that combines a two-dimensional position coding scheme with a one-dimensional amplitude (2DP1DA) coding scheme, e.g., 2-D Non-Zero/Zero Cluster VLC Method as described in U.S. Ser. No. 10/922,508 is used for coding the low-frequency coefficients, while conventional run-amplitude level variable length coding is used for coding the high-frequency coefficients. Note that in 2DP1DA, 2DP means two-dimensional position coding, and 1DA means one-dimensional amplitude. Furthermore, the DC value in of the transform of the block of image data is assumed to be encoded separately, so that only the AC coefficients are included. Note that the methods described herein are not limited to using a 2DP1DA coding scheme, and are generally applicable to any alternative low-frequency coding scheme and any alternative high-frequency coding scheme, with or without modifications, and also to encoding the DC value with the remainder of the quantized coefficients. For example, in addition to conventional two-dimensional variable length coding, the following provide alternate methods for the different, e.g., low-frequency and/or high-frequency regions, and those in the art will understand if and how to modify and incorporate the methods described therein for the low-frequency and/or high-frequency methods:

- U.S. patent application Ser. No. 10/439,536 filed 16 May 2003 to inventors Chen et al, titled VARIABLE LENGTH CODING METHOD AND APPARATUS FOR VIDEO COMPRESSION, and published as US 20040228540.
- U.S. patent application Ser. No. 10/342,537 filed 15 Jan. 2003 to inventors Chen et al, titled AN EXTENSION OF TWO-DIMENSIONAL VARIABLE LENGTH CODING FOR IMAGE COMPRESSION.
- U.S. patent application Ser. No. 10/440,595 filed 19 May 2003 to inventors Chen et al, titled AN EXTENSION OF TWO-DIMENSIONAL VARIABLE LENGTH CODING FOR IMAGE COMPRESSION.

U.S. patent application Ser. No. 10/869,229 filed 15 Jun. 2004 to inventors Chen et al, titled A HYBRID VARIABLE LENGTH CODING METHOD FOR LOW BIT RATE VIDEO CODING, and published as US 20050276487.

U.S. patent application Ser. No. 10/898,654 filed 22 Jul. 2004 to inventors Chen et al, titled AN EXTENDED HYBRID VARIABLE LENGTH CODING METHOD FOR LOW BIT RATE VIDEO CODING and published as US 20050276497.

U.S. patent application Ser. No. 10/910,712 filed 3 Aug. 2004 to inventors Chen et al, titled VIDEO COMPRESSION USING MULTIPLE VARIABLE LENGTH CODING PROCESSES FOR MULTIPLE CLASSES OF TRANSFORM COEFFICIENT BLOCKS and published as US 20050276498.

U.S. patent application Ser. No. 10/922,508 filed 18 Aug. 2004 to inventors Toebes et al, titled TWO-DIMENSIONAL VARIABLE LENGTH CODING OF RUNS OF ZERO AND NON-ZERO TRANSFORM COEFFICIENTS FOR IMAGE COMPRESSION and published as US 20060039621.

U.S. patent application Ser. No. 10/922,507 filed 18 Aug. 2004 to inventors Chen et al, titled VIDEO CODING USING MULTI-DIMENSIONAL AMPLITUDE CODING AND 2-D NON-ZERO/ZERO CLUSTER POSITION CODING and published as US 20060039620.

U.S. patent application Ser. No. 11/069,622 filed 28 Feb. 2005 to inventors Chen et al, titled AMPLITUDE CODING FOR CLUSTERED TRANSFORM COEFFICIENTS and published as US 20060039616.

U.S. patent application Ser. No. 11/069,621 filed 28 Feb. 2005 to inventors Chen et al, titled JOINT AMPLITUDE AND POSITION CODING FOR PHOTOGRAPHIC IMAGE AND VIDEO CODING and published as US 20060039615.

U.S. patent application Ser. No. 11/069,620 filed 28 Feb. 2005 to inventors Chen et al, titled ADAPTIVE BREAKPOINT FOR HYBRID VARIABLE LENGTH CODING and published as US 20050276499.

U.S. patent application Ser. No. 11/270,138 filed 9 Nov. 2005 to inventors Chen et al, titled EXTENDED AMPLITUDE CODING FOR CLUSTERED TRANSFORM COEFFICIENTS and published as US 20060056720.

U.S. patent application Ser. No. 11/385,183 filed 20 Mar. 2006 to inventors Chen et al, titled VARIABLE LENGTH CODING FOR CLUSTERED TRANSFORM COEFFICIENTS IN VIDEO COMPRESSION.

U.S. patent application Ser. No. 11/346,757 filed 3 Feb. 2006 to inventors Chen et al, titled VARIABLE LENGTH CODING FOR SPARSE COEFFICIENTS.

The contents of each of the above patent applications are incorporated herein by reference.

Two-Dimensional Position and One-Dimensional Amplitude Coding (2DP1DA)

For completeness, an example of 2DP1DA is included. Encoding the low-frequency region coefficients includes recognizing events—position events—describable by one or more parameters, such as the run-lengths of zero value coefficients, run-lengths of non-zero-amplitude coefficients, amplitudes, signs, and so forth. These parameter(s) are encoded, e.g., by a lookup device to look up appropriate one or more lookup tables.

One embodiment of two-dimensional (2D) variable length coding jointly encodes 2D position events (2DP events) that include any run of consecutive zero-valued coefficients preceding a run of non-zero-valued coefficients. No such preceding run zero-valued coefficients is indicated by a run-length of 0. So jointly encoding events by a 2D variable length code is found to be, on average, more efficient, for example, than encoding the same events by two independent 1D variable length codes.

In one embodiment, a single zero immediately following each non-zero coefficient cluster is included as part of the 2DP event. This effectively reduces the run-length of the zero-valued coefficients by 1 and the dimension representing run-lengths of zero-valued coefficients will start from 0 instead of 1.

Thus, one embodiment of encoding the low-frequency region of a sequence of coefficients includes two-dimensional position coding to encode events that include any run of zero-valued coefficients preceding a run of non-zero-valued coefficients, and encoding amplitude events using one-dimensional amplitude coding for the non-zero-amplitudes in the runs. No immediately preceding run of zeroes is indicated by a run-length of zero.

The inventors have found that extending the 2D position events can be extended to include the "last" information representing the end of the block. Using two-dimensional position and one-dimensional amplitude coding, consider the sample coefficient sequence:

2 3 2 −1 −1 0 0 1 −1 1 . . .

This is encoded as:

$C_p(0, 5, 0)C_A(2)S(0)C_A(3)S(0)C_A(2)S(0)C_A(1)S(1)C_A(1)S(1)C_p(1, 3, 1)C_A(1)S(0)C_A(1)S(1)C_A(1)S(0)$ where $C_p$(zrun, nzrun, last) denotes the 2D position code of an identified event. Note that in the above stream of codewords, the second position code is "$C_p(1, 3, 1)$" rather than "$C_p(2, 3, 1)$" because the first zero coefficient has been implicitly included in the first position event coded as $C_p(0, 5, 0)$.

While such 2D position coding is anticipated to provide on average improved coding efficiency over two 1D position coding, the size of the code table used is increased. For an 8×8 block, i.e., 64 coefficients along the scan path, the total size of a 2-D code table is roughly 2×63×64=8K, including accounting for the last information. In practice, to reduce the table size, events that are relatively unlikely to appear may be coded by an "Escape" code followed by fixed numbers of bits, which indicate the runs of zero- and non-zero-valued coefficients as well as the last information.

Method to Determine a Breakpoint Per Block

The above-cited incorporated by reference Per Block Breakpoint Determining Patent Application describes a per-block breakpoint determining method embodiment that includes, for a plurality of blocks of image data and a respective ordered sequence of quantized transform coefficients in each block, and for a pre-selected low-frequency coding method and a pre-selected high-frequency coding method, determining a breakpoint for each block. The pres-selected low-frequency coding method includes recognizing any events that includes a cluster of coefficients having respective amplitudes other than the most likely-to-occur amplitude, e.g., non-zero amplitudes, and recognizing amplitude events, or in other embodiments, recognizing joint position and amplitude events that each includes a cluster of coefficients. One embodiment includes for each block determining a set of possible breakpoints, each defined by an ending event recognized by the low frequency coding method, and the number of bits that would result from using the possible breakpoint by coding a first part of the sequence up to and including the ending event using the low-frequency coding method, and coding a second part of the sequence from the quantized coefficients immediately following the ending event. In one embodiment, the set of possible breakpoints and resulting numbers of bits are obtained by a first pass coding method and a second pass coding method. The first pass coding process includes encoding the ordered sequence using the selected low-frequency variable length coding method. The first pass coding process starts from the lowest-frequency (AC) quantized coefficient. In one embodiment, in order to be able to determine the numbers of bits used for the encoding, a data structure, e.g., a table is constructed for different locations of the ending event and tabulating the number of bits required to encode the portion of the sequence up to the ending event. In one example low-frequency coding method, position events include a run of any zero-valued coefficients that end in a single zero-valued coefficient. In one embodiment, a data structure is maintained that records three quantities for each ending event location that is coded by 2D position coding: the starting position of the event, e.g., starting with a position 0, the ending position of the event, and the accumulated number of bits that has been consumed to code the coefficients up to and including the ending event.

A second pass coding process includes encoding the sequence of the blocks using the selected high-frequency variable length coding method to determine the number of bits to encode different parts of the sequence each different part starting from after respective different ending event locations from the low-frequency method. In one embodiment, the selected high-frequency variable length coding method is performed in a reverse order starting from the non-zero-value coefficient that has the highest frequency index. In one embodiment, the accumulated number of bits of coding each part between the end of the sequence and just after each ending event used in the low-pass coding first pass is noted. Once the coding process reaches an ending position that was recorded in the first pass using the low-frequency coding method, the method adds the accumulated number of bits consumed by the high frequency method, in this case the run-amplitude level variable length coding to the corresponding entry from the first pass in the table.

Thus, in one embodiment, the second pass includes noting the total number of bits to encode the whole sequence for different ending events, the sequence encoded from the start to the ending event by the low-frequency method and from after the ending event by the selected high-frequency coding method.

One embodiment of the per-block method further includes comparing the total number of bits to encode the whole sequence for different ending event locations for events recognized in the first pass encoding, the total number of bits being the number of bits resulting from the first pass encoding to encode a first part of the sequence up to and including the ending event, and the number of bits resulting from the second pass encoding to encode a second part of the sequence starting from after respective different ending events.

One embodiment of the per-block method further includes selecting as a final ending event the ending event that results in the least total number of bits in the comparing.

One method embodiment further includes encoding the sequence by encoding a first portion of the sequence up to and including the final ending event using the selected low-frequency variable length coding method and encoding a second portion of the sequence from the first coefficient after the final ending event to the end of the sequence using the selected high-frequency variable length coding method.

In one embodiment, the per-block breakpoint found is a "soft" breakpoint in that it defines a position that the breakpoint is at the end of an event—the final ending event—coded by the low frequency coding method. One embodiment of the per-block method further includes encoding the location of the final ending event that defines the breakpoint, e.g., using a variable length coding method. One version encodes each breakpoint separately, while another method includes coding the breakpoints of a multi-block partition jointly using a multi-dimensional variable length coding method. An individual breakpoint can be coded by any indication of a location in the sequence between the starting position and the ending position of the final ending event coded by the low-frequency coding scheme, e.g., by a frequency index between the index values of the start and end of such final ending low-frequency event. Alternately, encoding the optimal breakpoint value includes encoding a number representing the ordinal value of the final ending event that is coded by low-frequency coding method, in other words, an index representing which of the ending events is the final ending event, e.g., the index 1 if the final ending event is the first ending event, the index 2 if the final ending event is the second ending event, and so forth.

Optimal Breakpoint Per Multi-Block Partition

Coding one optimal breakpoint per block introduces an overhead to the bitstream—the encoding of the location of the breakpoint. Although above cited incorporated by reference patent application for the per-block breakpoint determining method describes methods to encode the per-block breakpoint in a compressed way, one alternate is to use a method that reduces the overhead of breakpoints while preserving the coding performance of hybrid variable length coding.

Recall that a breakpoint for a block determined using the per-block breakpoint determining method is at the end of a recognized event—the final ending event—whose position can be specified in many ways, e.g., by any frequency coefficient index between the starting position and the ending position of the final ending event. It may be that the final ending event found for sequences of quantized transform coefficients of adjacent blocks of image data may overlap. In such a case, there may be one or more coefficient locations that all define the respective breakpoints of such blocks in which the respective final ending events overlap, that is that form an equivalence class. For such blocks whose respective final ending events overlap, only one codeword needs be sent to define the plurality of breakpoints.

Figure 2A:
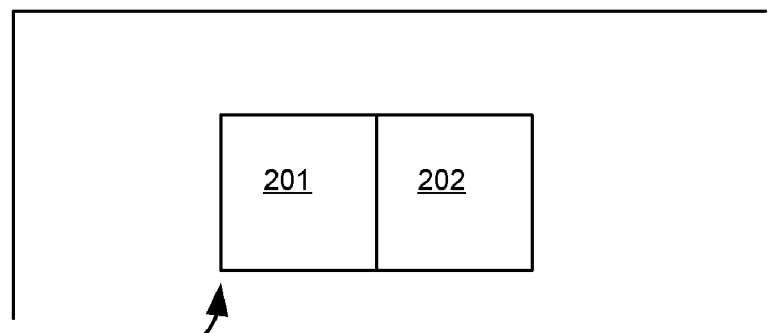
FIG. 2A shows an illustration of a 1-block by 2-block superblock for the sequences of quantized transforms coefficients of two blocks.
Figure 2B:
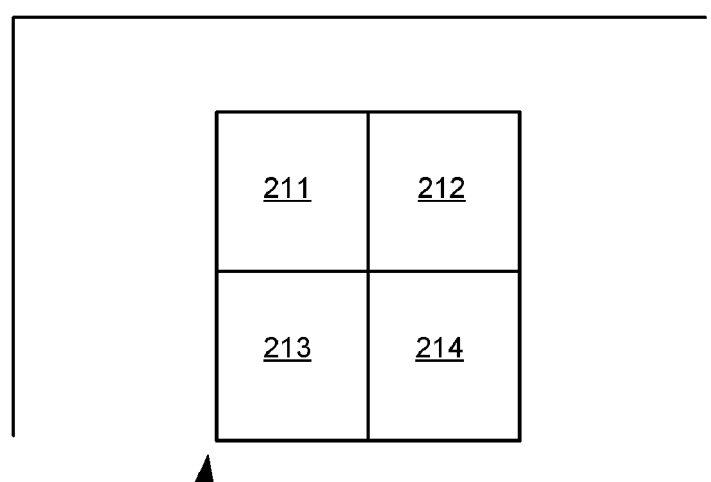
FIG. 2B shows an illustration of a 2-block by 2-block superblock for the sequences of quantized transforms coefficients of four blocks.
Figure 2C:
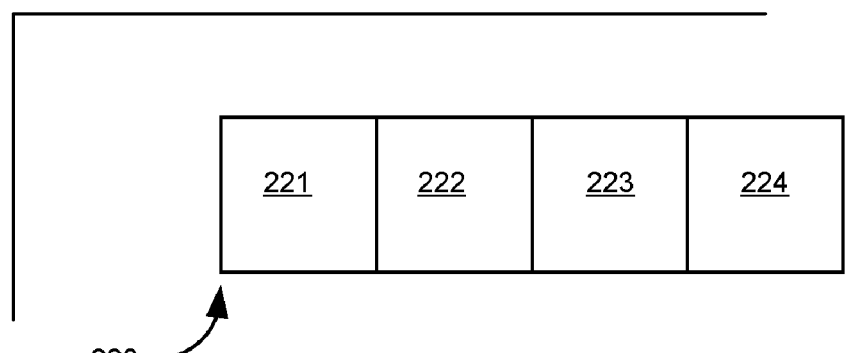
FIG. 2C shows an illustration of a 1 block by 4 block superblock for the sequences of quantized transforms coefficients of four blocks.

Consider a partition of adjacent blocks. Denote by $N_B$ the number of blocks in the partition. While these adjacent blocks can be for a partition of any shape, in some embodiments of the invention, a partition of adjacent blocks that is rectangular is selected, in that the $N_B$ blocks form what we call a "super-block" of $N_{B1}$ blocks by $N_{B2}$ blocks, where $N_B = N_{B1} \times N_{B2}$. FIG. 2A shows an illustration of such a 1-block by 2-block partition 205 of blocks 201 and 202. FIG. 2B shows an illustration of another partition—a 2-block by 2-block partition 210 of blocks 211, 212, 213, and 214. FIG. 2C shows an illustration of another 4-block partition, a 1 block by 4 block partition 220 of four blocks 221, 222, 223, and 224 of image data. Similarly, partitions can be formed for more than 4 blocks. Note that while some of the blocks are adjacent, not all blocks are adjacent is what we call a partition of a plurality of adjacent blocks. For example, in FIG. 2C, clearly block 221 is not adjacent to block 224.

Consider a multi-block partition and suppose a single breakpoint is selected for coding the sequences of quantized coefficients of all blocks in the partition. The selected breakpoint may be in an overlap of the final ending event for some of the blocks. However, there may not exist such an overlap for all blocks in the partition. Using a single breakpoint for multiple blocks in a partition might result in suboptimal performance for a particular block within the multi-block partition. Nevertheless, the inventors have found that using such a single breakpoint provides sufficiently close-to-optimum performance in a statistical sense, while it significantly reduces the overhead of breakpoints so as to achieve a reduced total number of bits in coding the entire partition.

Figure 3:
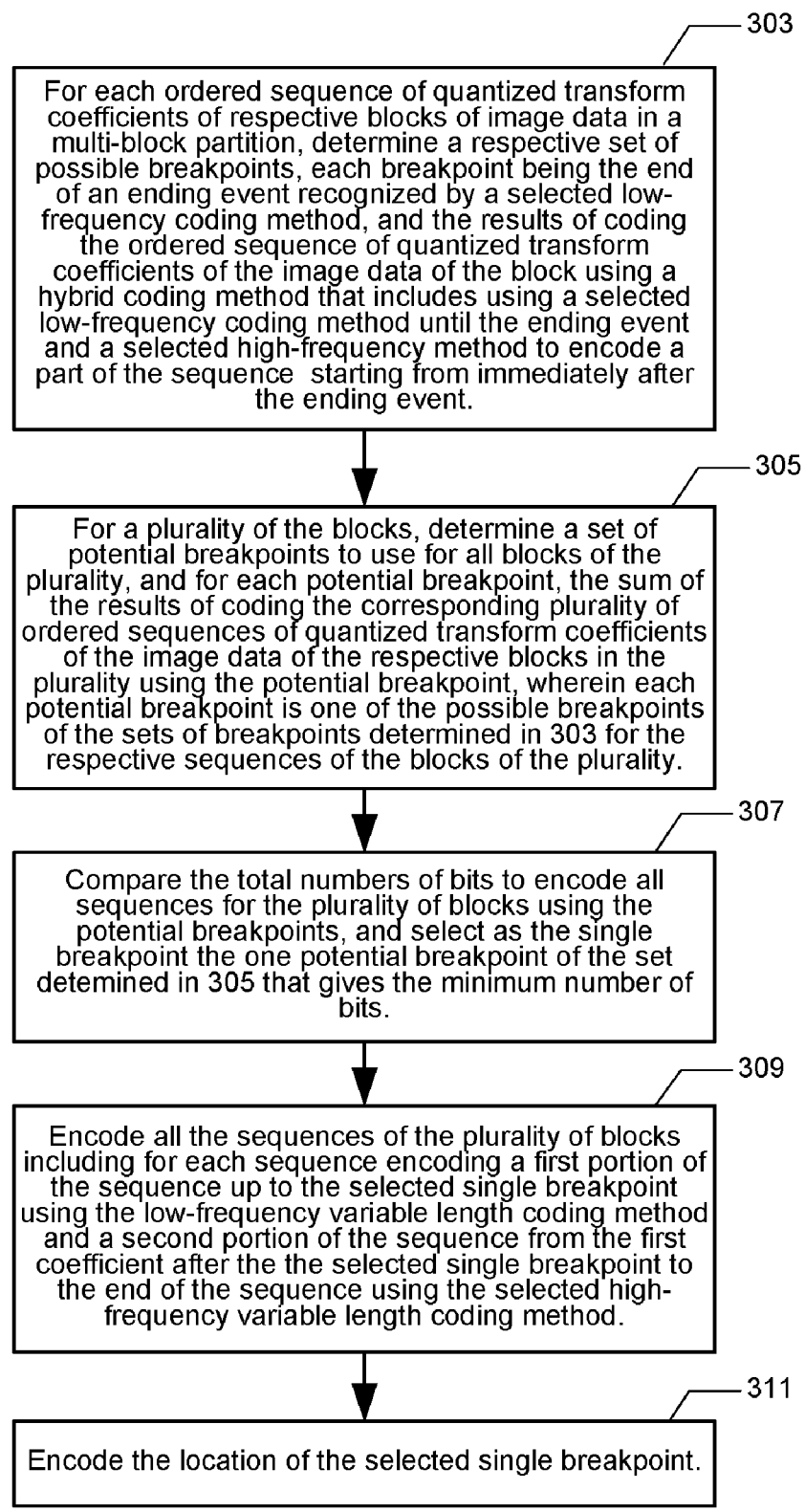
FIG. 3 shows a simplified flowchart of one embodiment of a method of determining a breakpoint for a multi-block partition of coefficients.

FIG. 3 shows one embodiment of determining a breakpoint for a multi-block partition. Assume a hybrid coding method that includes a selected low-frequency variable length coding method and a selected high-frequency variable length coding method. The low-frequency variable length coding method includes recognizing any event that includes a cluster of one or more consecutive non-zero quantized coefficients. In 303, for each block of image data in the multi-block partition, the method includes determining a respective set of possible breakpoints, each breakpoint being the end of an ending event recognized by the selected low-frequency coding method, and further determining the results of coding the ordered sequence of quantized transform coefficients of the image data of the block using the hybrid coding method that includes using the selected low-frequency coding method to encode a first part of the sequence until and including the ending event and using the selected high-frequency method to encode a part of the sequence starting from immediately after the ending event.

One embodiment of the invention includes after determining sets of possible breakpoints for each of a plurality of blocks that are in a partition of adjacent blocks, e.g., a superblock, using the determined sets of possible breakpoints to determine a single breakpoint to use for all the blocks in the partition. In one embodiment, the single breakpoint is the single breakpoint that is in the sets of possible breakpoints and that leads to the minimum number of bits in the codewords of the encoded sequences of all the blocks. That is, the breakpoint for the partition is the one breakpoint of the sets of possible breakpoints that leads to the least sum of all bits needed to encode the sequences of the blocks.

The inventors have found that using such a single breakpoint for a multi-block partition typically provides improved compression efficiency for hybrid variable length coding compared to using a single breakpoint for all blocks in an image.

Referring again to FIG. 3, after the sets of possible breakpoints are determined in 305, sub-process 305 includes, for a plurality of the blocks, e.g., for the multi-block partition of blocks, determining a set of potential breakpoints to use for all blocks of the plurality, and for each such potential breakpoint, determining the sum of the results of coding the corresponding plurality of ordered sequences of quantized transform coefficients of the image data of the respective blocks in the plurality using the potential breakpoint, wherein each potential breakpoint is one of the possible breakpoints of the sets of breakpoints determined in 303 for the respective sequences of the blocks of the plurality. That is, each potential breakpoint is defined by a corresponding ending event in one of the sequences of the blocks in plurality of blocks.

The method includes in 307 includes comparing the total number of bits that result in encoding all the sequences for the plurality of blocks—e.g., for the whole multi-block partition—using the potential breakpoints of the set determined in 305, and selecting as the single breakpoint the one potential breakpoint of the set determined in 305 that gives the minimum number of bits.

Once the single breakpoint is determined, the method includes in 309 encoding all the sequences of the plurality of blocks—e.g., for the whole multi-block partition—including for each sequence encoding a first portion of the sequence up to the selected single breakpoint using the selected low-frequency variable length coding method and a second portion of the sequence from the first coefficient after the selected single breakpoint to the end of the sequence using the selected high-frequency variable length coding method.

One embodiment of the method further includes in 311 encoding the location of the breakpoint using a breakpoint location variable length coding method.

Figure 4:
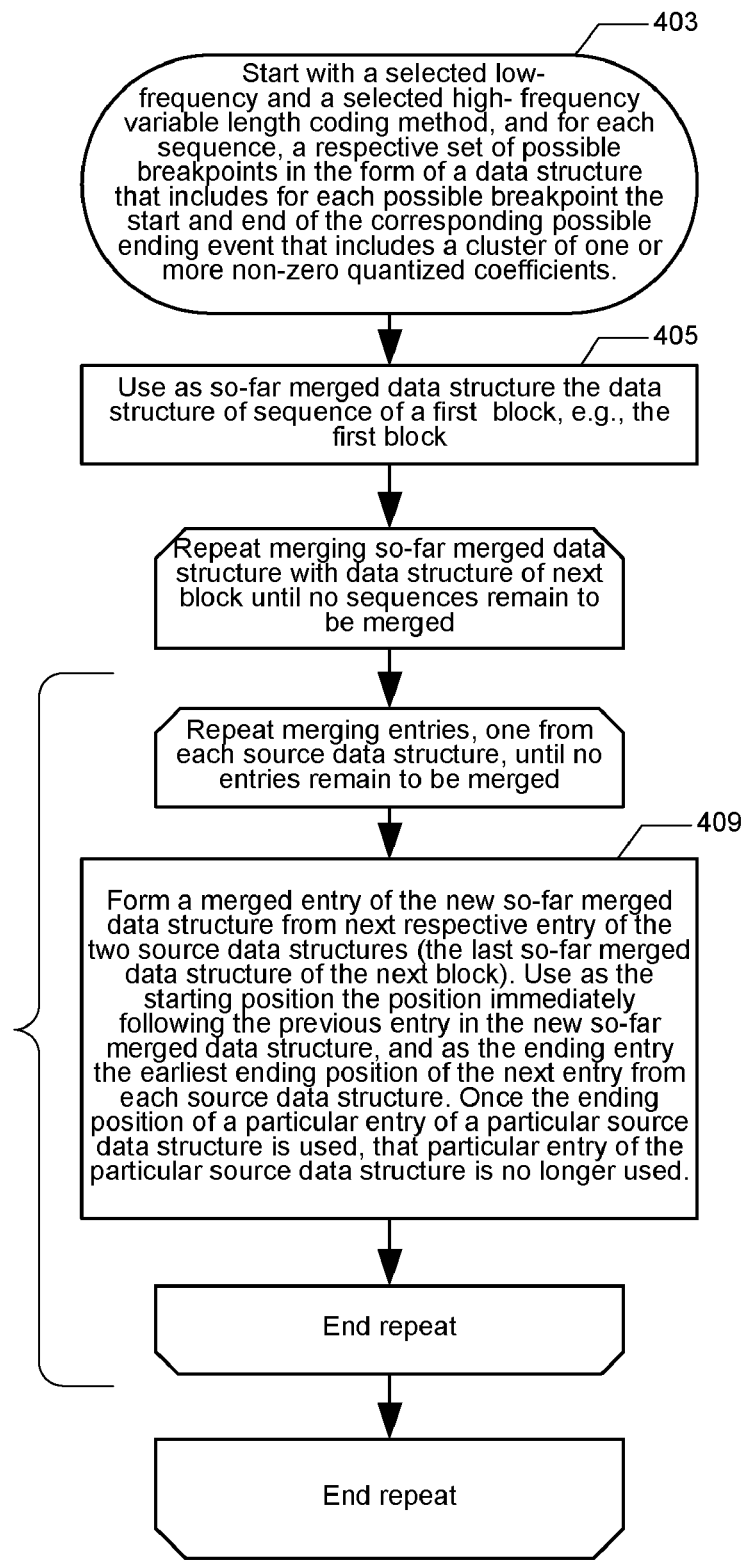
FIG. 4 shows a simplified flowchart of merging of data structures that each represent a set of possible breakpoints used in one embodiment of the invention.

FIG. 4 shows a flowchart for determining such a set of potential breakpoints for hybrid coding a plurality of sequences of quantized transform coefficients of a respective plurality of blocks. In one embodiment, the plurality of blocks is the whole multi-block partition. The flowchart of FIG. 4 assumed (start condition 403) the selected low-frequency and high-frequency variable length coding methods and assumes that there has been determined for each sequence a respective set of possible breakpoints, including for each set a data structure of entries for each possible breakpoint, e.g., a table of rows, one per possible breakpoint. Each entry includes for each possible breakpoint the start and end of the corresponding possible ending event of a cluster of one or more non-zero quantized coefficients. The selected low frequency coding method includes recognizing such events that each include such a cluster of one or more non-zero coefficients.

The method initially has no merged results, so, as shown in 405, in one embodiment the so-far merged data structure is initially the data structure representing the possible breakpoints of the sequence of a first block, e.g., the first block. This is merged with the data structure representing the possible breakpoints of the sequence of the next block to form a new so-far merged data structure, and this pairwise merging 407 of a pair of data structures of possible merging is until there is no sequence, i.e., no next block remaining to be merged.

The pairwise merging of two data structures, e.g., initially of the set of possible breakpoints corresponding to the sequence of the first block with the data structure of the set of possible breakpoints corresponding to the sequence of the second block is carried out to form the new so-car merged data structure entry-by-entry until there are no more entries to be merged.

Each entry of the new so-far merged data structure includes a start and end location in the sequence, with the start location being immediately after the ending location of the previous entry. For each entry in the new so-far merged data structure, two entries—one from each of the pairs of data structures are used, in 409, to form the merged entry in the new so-far merged data structure, including comparing the location of the ending events and selecting as the ending location of the merged entry that with the ending event that ends first along the ordering of the sequences. Once the ending location of an entry of the pair of data structures is so used, such an entry is no longer used for merging. The merging continues until no further entries of possible ending events are available, for merging.

This produces a newly merged data structure. If not all data structures of the plurality of blocks have been merged, the merged data structure is used as the selected data structure and the process is repeated by merging the selected data structure with a next data structure representing for the set of possible breakpoints for coding the sequence of the next block.

The data structures are thus merged pairwise, and the intermediate merged data structures are merged with the next data structure until a single merged data structure is determined as a result of merging all the data structures of the possible breakpoints.

In the following example, suppose the selected low-frequency variable length coding method 2DP1DA, and suppose a high-frequency coding method is selected, e.g., conventional run length variable length coding. In one embodiment, as an output of step 303, a hybrid variable length coding table is constructed for each block, which records three quantities for each two-dimensional position (2DP) event that is a possible ending event that defines a possible breakpoint: the starting position of the position event, the ending position of the position event, and the number of bits needed to code the block using a hybrid coding method with the possible event as the ending event. In 2DP1DA, a position event is a run of non-zero-value coefficients preceded by any run of zero-value coefficients preceding a run of non-zero-valued coefficients, followed by a single zero-valued coefficient, where no preceding run of zero-valued coefficients is represented by a run-length of 0. The ending position of a position event is the frequency index of the zero-value coefficient that follows the run of consecutive non-zero-value coefficients.

As an example, consider the example of FIG. 2A of a two-block partition 205 of blocks 201 and 202. FIG. 5A shows a first example sequence of AC quantized coefficients of a block 201 and FIG. 5B shows a second example sequence of AC quantized coefficients of the block 202.

FIGS. 6A and 6B show the hybrid variable length coding tables Table 1A and Table 1B containing respective sets of possible ending events, hence possible breakpoints constructed for blocks 101 and 102, respectively, as a result of step 303 of FIG. 3. In these tables, "$nbits_1(k_1)$" denotes the total number of bits that result from coding block 201 by hybrid variable length coding using the value "$k_1$" as the breakpoint, and "$nbits_2(k_2)$" denotes the total number of bits that result from coding block 202 by hybrid variable length coding using the value "$k_2$" as the breakpoint. The first entry in each table corresponds to the respective entire sequence being coded by the high-frequency coding method, and the last entry of each table corresponds to the respective entire sequence being coded by the selected low-frequency coding method. The entry that has the minimum number of bits indicates the optimal breakpoint for each particular block if the per-block breakpoint determining method was used.

One embodiment of step 407 includes merging the results of two coding tables to obtain a merged coding table of potential breakpoints. Each potential breakpoint is defined by a corresponding ending event in one of the sequences of the blocks in the multi-block partition. The second step includes table merging. The hybrid variable length coding table generated for a single block, such as Tables 1A and 1B, are each referred to as an individual table hereinafter. Every entry in the individual hybrid variable length coding table corresponds to an ending position event. Because each breakpoint can be denoted by any coefficient index between the starting position and the ending position of the corresponding ending position event, each event defines a set of frequency indices that are equivalent in that using them to define the breakpoint leads to the same number of bits for hybrid variable length coding. For example, for FIG. 6A for block 201, $nbits_1(1)=nbits_1(2)=nbits_1(3)=nbits_1(4)$, $nbits_1(5)=nbits_1(6)=nbits_1(7)=nbits_1(8)$, $nbits_1(9)=nbits_1(10)=nbits_1(11)=nbits_1(12)=nbits_1(13)$, and $nbits_1(14)=nbits_1(15)=nbits_1(16)=\ldots=nbits_1(63)$.

Similarly, for FIG. 6B corresponding to block 202, $nbits_2(1)=nbits_2(2)=\ldots=nbits_2(6)$, $nbits_2(7)=nbits_2(8)=\ldots=nbits_2(10)$, and $nbits_2(11)=nbits_2(12)=nbits_2(13)=\ldots=nbits_2(63)$.

These equalities are used in one embodiment to merge multiple individual hybrid variable length coding tables of sets of possible breakpoints to generate a single table of potential breakpoints each for use as a single breakpoint for all blocks in a plurality of blocks. The single breakpoint to use for the plurality is then selected using the merged hybrid variable length coding table.

To illustrate the table-merging process, consider merging blocks 201 and 202 of the two-block partition 205. To merge the tables of FIGS. 6A and 6B to form a merged table, one embodiment of the process includes in 409 combining individual entries from each table, and selecting for inclusion the entry that has the ending event that finishes first along its respective sequence. The starting location of the new entry is first 0, then the one frequency position after the ending location of the previous merged entry. Once an entry of the original tables being merged is selected for the ending location of a merged entry, it no longer is used in the merging.

Using the tables of FIGS. 6A and 6B as an example, the first entries of the two tables each have both starting and ending positions equal to 0. The first entry of the combined table starts at 0, and the ending position is also 0, corresponding the breakpoint position of 0, which is the case for coding both blocks solely by high-frequency coding. The result of so coding is $nbits_1(0)+nbits_2(0)$. The first entries of each table are no longer considered since the merged entry has a final location of 0, corresponding to the ending position of the first entry of both source tables.

The next entry in the merged table starts at the location after the ending location of the previous entry, so at frequency index 1. The two entries of Table 1A and 1B in FIGS. 6A and 6B have ending positions 4 and 6. The lower ending position is that of 4, chosen from Table 1A. So the next entry in the merged table ends at 4, and the results of hybrid coding using a breakpoint at frequency index 4 is coding result $nbits_1(4)+nbits_2(4)$. Note that $nbits_1(4)$ is available from Table 1A, and $nbits_2(4)=nbits_2(6)$ is available from Table 1B. So the results for the second entry are $nbits_1(4)+nbits_2(6)$. The second entry of Table 1A is no longer used for the merging.

For the third entry in the merged table, the starting position is $4+1=5$. The next two entries to merge are the third entry of Table 1A and the second entry of Table 1B. The lower ending frequency position is location 6, the second entry of Table 1B. Therefore, the third entry of the merged table starts at location 5 and ends at location 6. The results of using location 6 as a potential breakpoint is $nbits_1(6)+nbits_2(6)$. $nbits_1(6)$ is the same as $nbits_1(8)$ and is available in Table 1A (FIG. 6A), while $nbits_2(6)$ is available as the second entry of Table 1B (FIG. 6B). That second entry from Table 1B has now been included in the merged table, so it is no longer considered.

FIG. 7 shows Table 2 that results from so merging the results of Tables 1A and 1B of FIGS. 6A and 6B, and provides the set of potential breakpoints for encoding both blocks of the partition 205 with a single breakpoint.

Note while ending events from one set of possible breakpoints or another is used to determine each row of the merged table of FIG. 7, as shown for instructional purpose in the last column of Table 7, selecting any one of the breakpoints as the single breakpoint for encoding all the tables and the soft nature of breakpoints means that each sequence of quantized coefficients is encoded using hybrid coding using a slightly different actual breakpoint that is represented by the single chosen breakpoint.

In the case of multi-block partition 205 (see FIG. 2A), returning to FIG. 3, in step 307, the total numbers of bits to encode all the coefficients of the blocks are compared for the different potential breakpoints, and a single breakpoint is selected. Suppose for example, that the row index 3 in Table 2 of FIG. 7 has the minimum number of bits. In such a case the selected breakpoint is at frequency index 8.

Note that when the encoding occurs, using a soft breakpoint defined by frequency index 8 means block 201 is encoded using the low-frequency variable length coding method up to frequency index 8, and block 201 is encoded using the low-frequency variable length coding method up to frequency index 10.

In the case of more than two blocks, e.g., consider FIG. 2B of a four block partition 210. Suppose FIG. 6A represents possible breakpoints for block 211, FIG. 6B represents possible breakpoints for block 212. FIG. 7 is the result of pairwise merging Tables 1A and 1B. Table 2 of FIG. 7 is merged with a further table of the sequence of block 213, then the resulting merged table is further merged with a table of possible breakpoints for block 214. This results in a single merged table of potential single breakpoints to use for the whole multi-block partition.

Once the entry that gives the minimum number of bits is selected from the merged table, any frequency index value from the starting position to the ending position can be used to define the breakpoint for the whole multi-block partition.

In one embodiment, the starting position of the entry is selected, as it has the smallest value and therefore should be codable as a shorter variable length codeword.

The method includes assigning a variable length codeword to encode the breakpoint.

In one embodiment, the context of the multi-block partition is differentiated by counting the number of blocks in the partition that have non-zero-value coefficients in order to further increase the compression efficiency. The distribution of breakpoints may vary under different cases. For example, if there is only one out of four blocks that has non-zero coefficients, it is more likely that the block has just a few coefficients and the breakpoint would be zero such that the sequence of the block will be encoded by the selected high-frequency coding method, e.g., conventional run-amplitude level variable length coding. On the other hand, the more blocks that have non-zero coefficients, the more likely a non-zero optimal breakpoint will be obtained.

In one embodiment, whether or not a particular block has only zero-valued coefficients is included with the coded bitstream of a multi-block partition, e.g., as a header for the block. One embodiment uses different variable length codes, e.g., using different variable length coding tables to code the breakpoint of a multi-block partition in correspondence to the scenarios where there are different numbers of blocks in the partition.

In one embodiment, an indication of the breakpoint location is jointly encoded with one or more other indications of respective locations of breakpoints determined for other multi-block partitions of sequences. This uses joint variable length coding methods, e.g., using multi-dimensional variable length coding tables. Such coding tables are obtained using assumed or measured statistics.

Additional Low-Frequency Coding Methods

Different embodiments of the invention can use different methods for the low-frequency variable length coding method, and also different methods for the high-frequency coding methods.

One embodiment of the low-frequency coding method is described above and includes two-dimensional position and one-dimensional amplitude coding (2DP1DA).

One-Dimensional Position and One-Dimensional Amplitude Coding (1DP1DA)

One embodiment of the low-frequency variable length coding method includes using one-dimensional position and one-dimensional amplitude coding (1DP1DA) to represent the position and the coefficient amplitudes of any clusters in the low-frequency region. Conventional run-level coding is used to represent the position and amplitude information for each non-zero-valued coefficient individually. In one embodiment, for a cluster of non-zero-valued coefficients, an alternative way of denoting the position and amplitude information is to indicate (a) the run of zero-valued coefficients preceding the non-zero cluster, (b) the run of non-zero-valued coefficients in the cluster, and (c) the magnitudes (and the signs) of the non-zero-valued coefficients. Three symbols: zrun, nzrun, and level, are used to denote the information. Thus, one embodiment includes recognizing events that are denoted by these symbols.

In one embodiment, each of the events denoted by these is encoded by a variable length code, e.g., using a variable length coding (VLC) table. Such a VLC table can be constructed by collecting statistics of consecutive non-zero-valued coefficients from test video sequences, or assuming such statistics, and applying Huffman coding to the collected statistics. Note that in practice, some of the less likely-to-occur events are encoded by fixed length codes. Because both the position and amplitude information is encoded by one-dimensional (1D) VLC, such a coding scheme for low-frequency coefficients is referred to as one-dimensional position and one-dimensional amplitude coding herein. An encoder finds events that include the run-length of zero-valued coefficients, the run-length of non-zero-valued coefficients, and the amplitudes of the non-zero-valued coefficients, and encodes them using three respective 1D VLC tables. In one embodiment, the codewords are then concatenated to present a complete bitstream.

As an example, consider the following low-frequency quantized coefficients of a block after the zig-zag ordering process:

2 3 2 −1 −1 0 0 1 −1 1 | 0 0 . . .

where | represents the breakpoint. Coding the above coefficients by one-dimensional position and one-dimensional amplitude coding generates the following codeword stream:

$C_n(5)C_A(2)S(0)C_A(3)S(0)C_A(2)S(0)C_A(1)S(1)C_A(1)S(1)$
$C_z(2)C_n(3)C_A(1)S(0)C_A(1)S(1)C_A(1)S(0)EOB$ where $C_n(\bullet)$, $C_z(\bullet)$, and $C_A(\bullet)$ denotes the codes for the run-length of non-zero-valued coefficients, the run-length of zero-valued coefficients, and the amplitude of the non-zero-valued coefficient, respectively. S(0) and S(1) denote + and − signs of a non-zero-valued coefficient, respectively. EOB represents an "end-of-block" symbol and is used to indicate the end of non-zero-valued coefficients in the block.

Two-Dimensional Position and Multi-Dimensional Amplitude Coding (2DPmDA)

One embodiment of the invention that uses hybrid coding includes recognizing and encoding two-dimensional position events and rather than using one-dimensional amplitude variable length coding, uses multi-dimensional variable length coding to encode runs of more than one consecutive non-zero-valued amplitudes. That is, for a run of "m" consecutive non-zero-valued coefficients, instead of using "m" one-dimensional variable length codes, a single 'm' dimensional code, e.g., coding table is used to code the entire 'm' coefficients. As an illustration, the sample coefficient sequence:

2 3 2 −1 −1 0 0 1 −1 1 | 0 0 . . .

can be encoded as:

$C_p(0, 5, 0)C_{A5}(2, 3, 2, 1, 1)S(0)S(0)S(0)S(1)S(1)C_p(1, 3, 1)$
$C_{A3}(1, 1, 1)S(0)S(1)S(0)$ where $C_{A5}(2, 3, 2, 1, 1)$ is used to denote the 5-dimensional amplitude code of the event (2, 3, 2, 1, 1) and $C_{A3}(1, 1, 1)$ denotes the 3-dimensional amplitude code of the event (1, 1, 1).

While extending "m" one-dimensional amplitude codes to one m-dimensional amplitude code is possible, the size of the m-dimensional code table can become too large for some practical implementations. As an example, if the magnitude of the non-zero-valued coefficients is between 1 to 31, the size of the largest table can become as large as $31^m$. In order to make the size of the m-dimensional tables manageable for a practical implementation, the size of m in some embodiments is restricted to a relatively low number such as 2 or 3. The number of non-zero-valued coefficients beyond the restricted numbers is re-sorted back to use multiple one-dimensional tables.

Integrated Position and Amplitude Coding (mDPAInt), Also Called Joint Position and Amplitude Coding.

Rather than encoding the position and amplitude of clustered non-zero-valued coefficients in the low-frequency region independently, some embodiments of low frequency encoding include jointly coding the position and the amplitude events. As an illustration, the sample coefficient sequence:

2 3 2 −1 −1 0 0 1 −1 1 | 0 0 . . .

can be encoded as:

$C_{pA}$(0, 5, 0; 2, 3, 2, 1, 1)S(0)S(0)S(0)S(1)S(1) $C_{pA}$(1, 3, 1; 1, 1, 1)S(0)S(1)S(0)

where $C_{pA}(\bullet, \bullet, \ldots)$ represents a joint position and amplitude variable length code implemented, for example, using a joint position and amplitude variable length code table.

While joint (m+2)-dimensional position and amplitude coding without size limitation is possible, in a practical implementation, the size of the code table is typically limited. For example, the magnitude of the coefficients and the number of coefficient clusters is limited to relatively small values.

Integrated Position and Amplitude Coding with Low Valued Amplitude and Low Number of Clusters Coding, e.g., 3D Integrated Position and Amplitude Coding In clustered non-zero-valued coefficients, it was observed that the magnitude of the quantized transform coefficients is dominated by the magnitude value 1. One embodiment of integrated position and amplitude low-frequency region encoding exploits this to further improve the coding efficiency. More specifically, the appearances of clusters of consecutive runs of amplitude-1 coefficients or consecutive non-zero-non-amplitude-1 coefficients are extracted from the amplitude symbols and jointly encoded with 2D coefficient positions as an integrated 3D position/amplitude coding. Needless to say, all non-zero-valued coefficients with magnitude other than one must be coded by an additional 1D variable length code. Since it is already known that all the non-1 amplitudes have magnitudes of larger than 1, in one embodiment, their magnitudes are subtracted by 1 prior to encoding to construct shorter codewords.

Excluding the "last" information, one embodiment of integrated 3D position/amplitude events recognizes events that are defined by three quantities: run-length of any preceding zero coefficients, run-length of the non-zero-valued coefficients, and wherein the non-zero-valued coefficient is amplitude 1 or not. No immediately preceding run is indicated by a run-length of zero.

The size of the code table needed grows exponentially as the number of non-zero clusters increase. One embodiment includes limiting the size of the code table by limiting the maximum length of non-zero coefficient clusters. In one such embodiment, all the symbols with non-zero clusters exceeding the maximum cluster length are encoded by an "Escape" code followed by fixed numbers of bits indicating the corresponding information.

As an illustration, the sample coefficient sequence:

2 3 2 −1 −1 0 1 0 1 −1 1 | 0 0 . . .

can be encoded (including last) as:

$C_{pA}$(0, 5, xxx11, 0)$C'_A$(1)S(0)$C'_A$(2)S(0)$C'_A$(1)S(0)S(1)S(1)$C_{pA}$(1, 3, 111, 1)S(0)S(1)S(0), where $C_{pA}(\bullet, \bullet, \bullet, \bullet)$ represents the variable length code for the integrated position/amplitude symbols including the run-length of zero-valued coefficients, the run-length of non-zero-valued coefficients, the 1/non-1 magnitudes, and the last information, and where $C'_A(\bullet)$ represents the 1D variable length code for one less than the magnitude of non-zero-valued coefficients that have amplitudes other than-one.

Other low-frequency and high-frequency encoding methods are possible, as described in the above-cited incorporated-by-reference patent applications.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including an encoding of the breakpoint locations, recognizing codewords in the bitstream and decoding the codewords.

Performance Evaluation

The inventors tested the presented approaches by implementing the methods in a coder that conforms to ITU-T recommendation H.263 (ITU-T, "Video coding for low bitrate communications," Draft Recommendation H.263, May 1996) using the reference codec software known as "Video Codec Test Model Near-Term, Version 3 (TMN3), Release 0", H.263 Ad Hoc Group. TMN 3.0 was previously released to the public by the Signal Processing and Multimedia Group, University of British Columbia, spmg.ece.ubc.ca. H.263 uses an 8×8-block DCT and run-level variable length coding for the quantized transform coefficients. Differently, for INTRA-coded blocks, the DC (0, 0) coefficient, after 8×8 DCT, is encoded separately and the remaining 63 AC coefficients are encoded by run-level variable length coding, whereas for INTER-coded blocks, all the 64 coefficients are encoded by run-level variable length coding. For multi-block partition, it is referred to 16×16-macroblock (MB), which contains four 8×8 blocks.

Video sequences used in the tests included three resolutions: QCIF (176×144), CIF (352×288), and 4CIF (704×576), with two sequences for each resolution. Each test sequence had 300 frames with a frame rate of 30 frames per second (fps). In every 15 frames 1 frame was enforced to be coded as an INTRA-frame. For both INTRA- and INTER-coded frames, a quantization parameter (QP) of 6 was used.

Each of the presented coding approaches was investigated following three steps: statistics collection, code-table generation, and codec implementation. In the first step, event statistics were collected from a set of test video sequences. Such statistics include the statistics of the breakpoint, the statistics of the low-frequency event, and the statistics of the high-frequency event. Each type of statistics was collected for INTRA- and INTER-coded blocks, respectively.

Using the collected statistics, Huffman code tables were generated for the variable length coding. To limit the size of the code tables, only events with non-zero frequencies in the statistics were assigned with code words. All the remaining events were coded by an 'Escape' code followed by certain numbers of bits to represent the information. For example, a 2D position event that is not assigned with a code word will be encoded by 'Escape' followed by 6 bits for the run-length of zeros, 6 bits for the run-length of non-zero coefficients, and 1 bit to indicate the last non-zero coefficient in the block.

While hybrid variable length coding code tables were constructed based on the statistics collected from test sequences, one embodiment of the methods described above included using initial code tables to find the optimal breakpoint and collect the statistics. This contradiction was resolved by using hybrid variable length coding code tables generated with a fixed breakpoint as initial tables and updating them iteratively with collected statistics. After that, the final code tables were generated.

The results showed that the methods described herein using variable breakpoints improved the coding performance of hybrid variable length coding on both INTRA- and INTER-coded blocks, compared to the case of constant breakpoint. Compared to the approach of jointly coding breakpoints, which also deploys one breakpoint per block, coding the breakpoint in a joint and embedded manner provides comparable or improved coding performance for the test sequences. Meanwhile, it requires less computational load to find a proper breakpoint for each block.

While the investigation the inventors performed used transform coefficients that were quantized using a quantization parameter (QP) of 6, other embodiments can use different quantization parameters. Tests with other sequences and other quantization parameters can lead to different, e.g., different optimized variable length coding tables.

Apparatus

While the above descriptions were mostly of coding methods, those in the art will understand that from the above description, a coding apparatus can straightforwardly be built, so that some embodiments of the invention are in the form of coding apparatuses. Furthermore, a decoding apparatus can be built.

Figure 8:
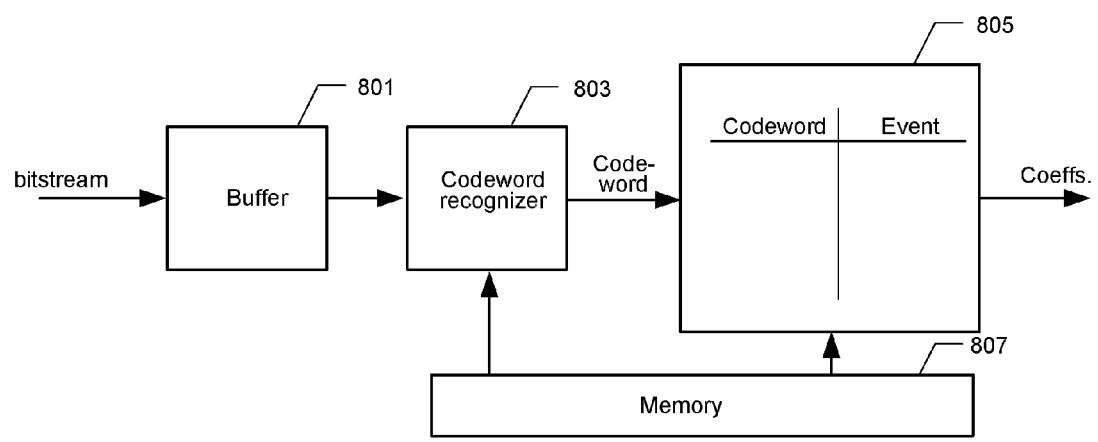
FIG. 8 shows one embodiment of a decoder operable to decode a bitstream that includes codewords encoded according to an embodiment of the method described herein.

FIG. 8 shows one embodiment of a decoder. The apparatus includes an input buffer 801 that is operable to accept a bitstream encoded by a compression method that includes a variable length coding method that, for example, includes a low-frequency coding method and a high frequency coding method. The low-frequency coding method uses an event recognizer and one or more coding tables to code recognized events. The coding method further includes determining a breakpoint and encoding the location of the breakpoint.

The output of the buffer acts as input to a codeword recognizer 803 that accepts the bits of the input bitstream and that is operable to determine which of the coding tables the codeword is from. A decoder 805 is coupled to the codeword recognizer 803 and is operable to determine the data for the codeword recognized by the codeword recognizer e.g., encoding of the breakpoint, whether a low-frequency or high frequency codeword, the run-length of non-zero-valued coefficients, the run-length of zero-valued coefficients, the amplitude(s), the sign, etc. In one embodiment, the decoder 805 includes a lookup device that looks up the appropriate decoding table stored in a memory 807. That table provides the event for at least some of the codewords of the set of codewords. Other codewords may include an "escape" code, so that decoding is by other than a table lookup method.

While in the embodiment shown in FIG. 8, the memory is shown separate from the lookup device (decoder) 805, those in the art will understand that in other embodiments, the lookup device 805 includes memory for the tables, and such other embodiments are included herein.

Figure 9:
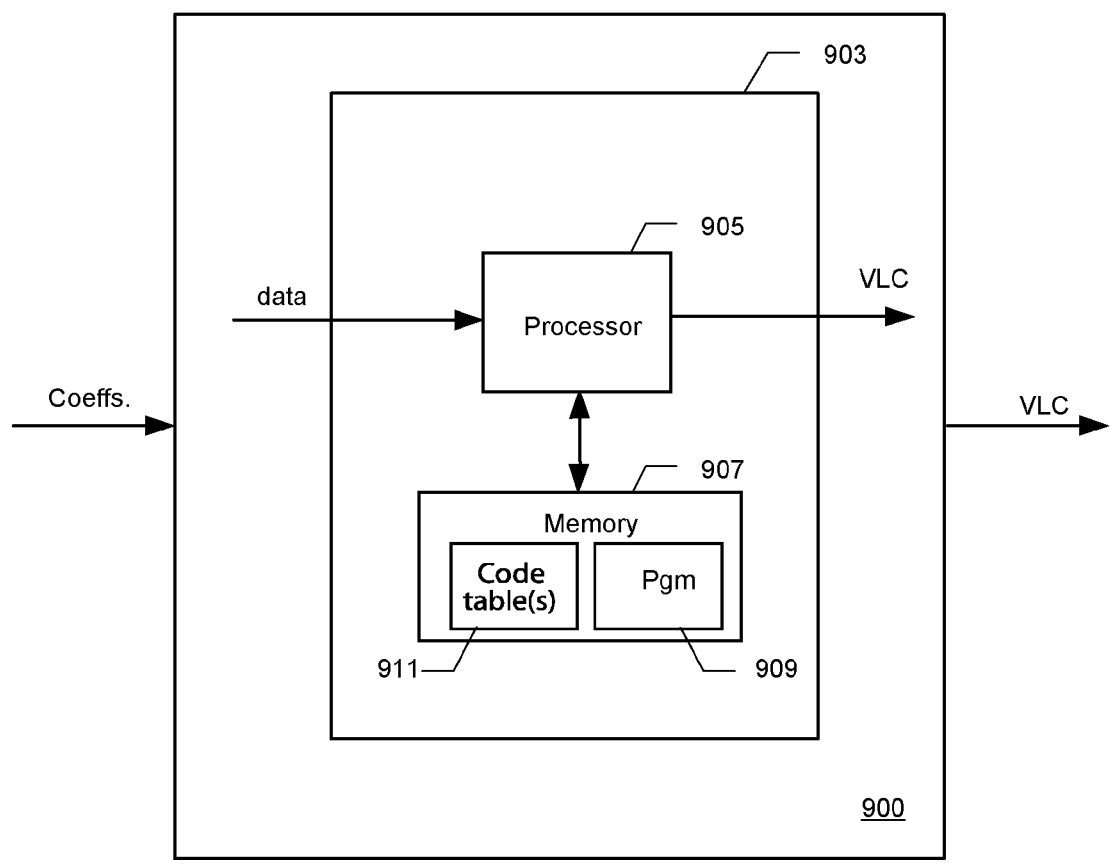
FIG. 9 shows an embodiment that includes an apparatus that is operable to implement a coding method as described herein.

FIG. 9 shows another embodiment that includes an apparatus 900 that is operable to implement a coding method as described herein, including determining a variable breakpoint and encoding the location of the breakpoint. Apparatus 900 includes processing system 903 that includes one or more processors 905 and a memory 907. A single processor is shown in FIG. 9 and those in the art will appreciate that this may represent several processors. Similarly, a single memory subsystem 907 is shown, and those in the art will appreciate that the memory subsystem may include different elements such as RAM, ROM, and so forth. In addition, the memory subsystem is meant to include any non-volatile memory storage such as a magnetic or optical storage component. A computer program 909 is included and is loaded into the memory 907. Note that at any time, some of the programs may be in the different parts of the memory subsystem, as will be understood by those in the art. The program 909 includes instructions to instruct the processor to implement, in different versions, the different coding methods usable as the second variable length coding method. In the embodiment shown, the method uses one or more coding tables 911 in the memory subsystem 907.

Figure 10:
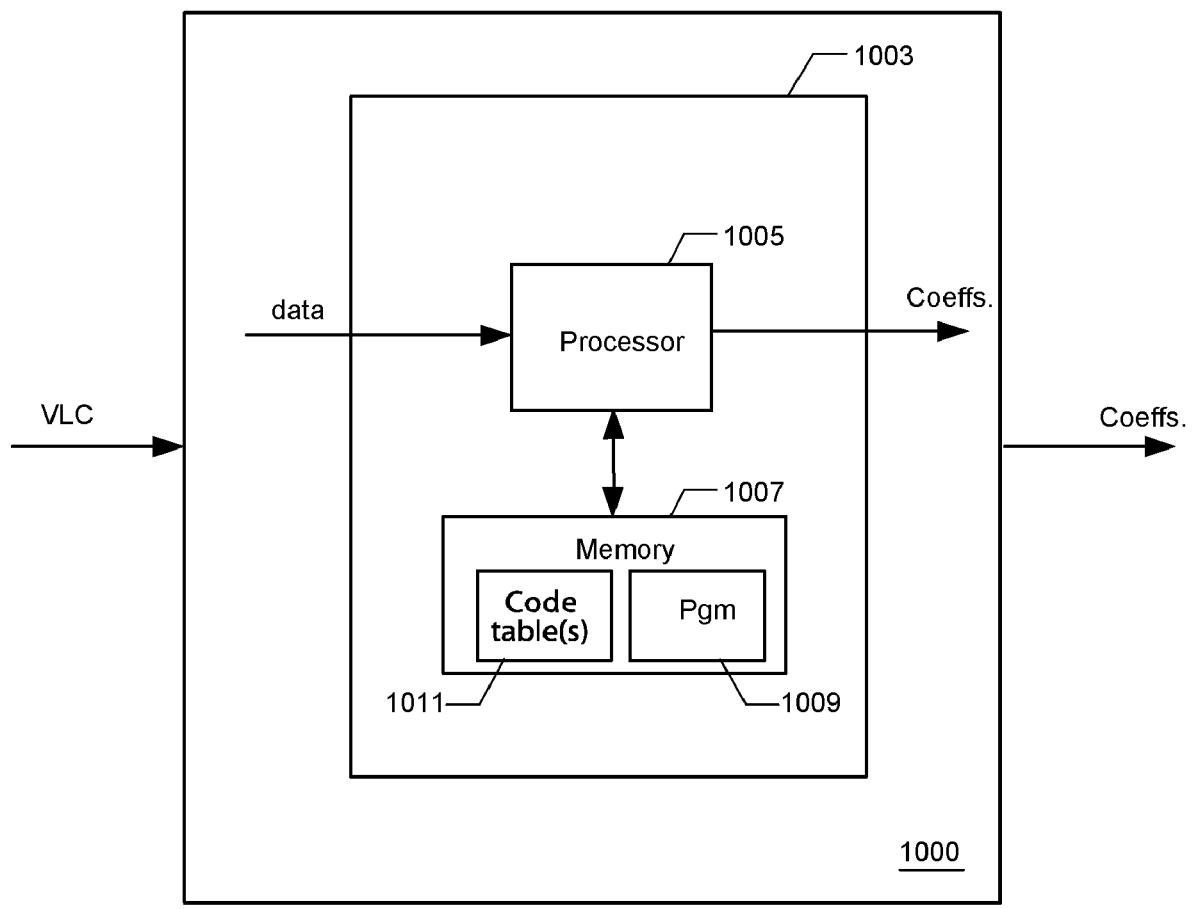
FIG. 10 shows an embodiment that includes an apparatus operable to implement a decoder of a variable length coding method described herein.

FIG. 10 shows another embodiment that includes an apparatus 1000 operable to implement a decoder of a variable length coding method described herein that includes determining a variable breakpoint and encoding the location of the variable breakpoint. Decoding apparatus 1000 includes a processing system 1003 that includes one or more processors 1005 and a memory 1007. A single processor is shown in FIG. 10 and those in the art will appreciate that this may represent several processors. Similarly, a single memory subsystem 1007 is shown, and those in the art will appreciate that the memory subsystem may include different elements such as RAM, ROM, and so forth. In addition, the memory subsystem is meant to include any non-volatile memory storage such as a magnetic or optical storage component. A computer program 1009 is included and is loaded into the memory 1007. Note that at any time, some of the programs may be in the different parts of the memory subsystem, as will be understood by those in the art. The program 1009 includes instructions to instruct the processor to implement, in different versions, the recognizing and decoding of codewords. In the embodiment shown, the decoding method uses one or more coding tables 1011 in the memory subsystem 1007.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable carrier medium carrying a set of instructions that when executed by one or more processors of a processing system cause the one or more processors to carry out any of the coding methods described herein.

Other embodiments include a computer-readable carrier medium carrying a set of instructions that when executed by one or more processors of a processing system cause the one or more processors to carry out any of the decoding methods described herein.

As described above, alternative low-frequency coding schemes with variable breakpoints, such as the integrated position and amplitude coding, can be used. See the above-referenced and incorporated herein by reference patent applications for alternate low-frequency and high-frequency methods.

The term "sequence" as used herein for the sequence of quantized coefficients is sometimes referred to as a "block" of coefficients, and also as a "series" of coefficients. Those in the art will understand that such terms may be interchangeably used and the meaning would be clear to those in the art from the context.

Note that the description herein assumes that each series includes two regions, a low-frequency region, and a high-frequency region. It is possible to partition the whole sequence containing all the coefficients of the transforming, quantizing and ordering the block of image data. The methods described herein would then be applicable to a sequence that does not necessarily include all of the quantized coefficients but that still includes a low-frequency region where non-zero-valued quantized coefficients are likely to be clustered, and an immediately following high-frequency region where non-zero-valued quantized coefficients are likely to be scattered amongst zero-valued quantized coefficients. Those in the art will therefore understand that the claims herein are applicable to such a case, the breakpoint being the location between the low- and high-frequency regions. For example, the sequence in such a case could include just low- and high-frequency regions and not the whole sequence of quantized transform coefficients.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The discrete cosine transform (DCT) is one possible transform. Other transforms may be used, e.g., the new H.264/MEG-4 AVC video coding standard/draft standard defines 4×4 blocks and a DCT-like 4×4 integer transform.

The invention does not depend on any particular type of inter-frame coding if used, or of motion compensation if used for inter-frame coding, or any intra-estimation if used for estimating the pixels of a block using information from neighboring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

Note that in some examples for amplitude encoding, 63 or 127 possible non-zero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, (i) in one set of embodiment, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
 (I) dividing an image into blocks of image data, forming a plurality of multi-block partitions by grouping adjacent blocks; and
 (II) for each multi-block partition:
  (a) for each ordered sequence of quantized transform coefficients of respective blocks of image data in the multi-block partition, determining a respective set of possible breakpoints, each possible breakpoint indicating an ending event recognized by a selected low-frequency coding method that includes recognizing any event that includes a cluster of one or more quantized coefficients having amplitude other than the most likely-to-occur amplitude, and for each possible breakpoint, determining the number of bits to encode the ordered sequence of quantized transform coefficients of the block using a hybrid coding method that includes using the selected low-frequency coding method until the ending event and a selected high-frequency coding method to encode a part of the sequence starting from immediately after the ending event;
  (b) determining a set of potential breakpoints to use for all blocks in the multi-block partition, wherein each potential breakpoint is one of the possible breakpoints of the sets of breakpoints determined in (a) for the respective sequences of the blocks in the multi-block partition, and for each potential breakpoint, determining the total number of bits to encode all the ordered sequences of quantized transform coefficients of the blocks in the multi-block partition using the hybrid coding method with the ending event indicated by the potential breakpoint;
  (c) comparing the total numbers of bits to encode all the ordered sequences of quantized transform coefficients of the blocks in the multi-block partition using the hybrid coding method with the ending events indicated by the potential breakpoints of the set determined in (b), and selecting as the single breakpoint the one potential breakpoint of the set determined in (b) that gives the minimum total number of bits; and
  (d) encoding all the sequences of the blocks in the multi-block partition using the hybrid coding method with the ending event indicated by the selected single breakpoint, including for each sequence encoding a first portion of the sequence up to the ending event using the selected low-frequency coding method and a second portion of the sequence from the first coefficient after the ending event to the end of the sequence using the selected high-frequency coding method.

2. A method as recited in claim 1, wherein (a) includes determining for each respective set of possible breakpoints a corresponding data structure that includes for each possible breakpoint an indication of the location of the corresponding possible ending event that includes a cluster of one or more non-zero quantized coefficients.

3. A method as recited in claim 1,
wherein (a) includes determining for each respective set of possible breakpoints a corresponding data structure that includes for each possible breakpoint an indication of the location of the corresponding possible ending event that includes a cluster of one or more non-zero quantized coefficients, and
wherein (b) includes pairwise merging of data structures, including, for pairwise merging of a two source data structure, repeating merging entries, one from each source data structure, until no entries remain to be merged, to form a so-far merged data structure, each merged entry of the so-far merged data structure including indications of a starting position and an ending position of potential breakpoints, wherein forming a merged entry of the so-far merged data structure from the next respective entries of the two source data structures includes using as the starting position the position immediately following the previous entry in the so-far merged data structure, and as the ending position the earliest ending position of the next entry from each source data structure, including, once the ending position of a particular entry of a particular source data structure is used, no longer using the particular entry of the particular source data for the merging.

4. A method as recited in claim 2, wherein each data structure is a table, and each entry for a possible breakpoint is a row or column of the table.

5. A method as recited in claim 1, wherein step (a) includes for each ordered sequence of quantized transform coefficients of a block in the multiblock partition,
(i) encoding the ordered sequence using the selected low-frequency variable length coding method that includes recognizing any event that includes a cluster of coefficients having respective amplitudes other than the most likely-to-occur amplitude;
(ii) encoding the ordered sequence using the selected high-frequency variable length coding method to determine the numbers of bits to encode different parts of the sequence, each different part starting from after respective different event locations of the different events recognized in the selected low-frequency method used in (i); and
(iii) generating the total numbers of bits to encode the sequence for different ending event locations for events recognized in (i), the total number of bits being the number of bits resulting from the encoding in (i) to encode a first part of the sequence up to and including the ending event, and the number of bits resulting from the encoding of (ii) to encode a second part of the sequence starting from after respective different ending events, such that a set of possible ending events is determined, and such that results of using the different possible breakpoints defined by the different possible ending events are determined.

6. A method as recited in claim 1, wherein the quantized transform coefficients are such that 0 is the most likely to occur amplitude, and 1 is the next to most likely to occur amplitude.

7. A method as recited in claim 1, further comprising encoding an indication of the location of the selected single breakpoint.

8. A method as recited in claim 7, wherein the location of the selected single breakpoint is indicated by a range of one or more frequency locations, and wherein the encoding of the indication uses a variable length code that encodes any one position in the range that defines the selected single breakpoint.

9. A method as recited in claim 8, wherein the encoding of the indication encodes the earliest position in the range.

10. A method as recited in claim 7, wherein the encoding of an indication of the breakpoint location is a joint encoding of the indication of the breakpoint location with other indications of respective locations of breakpoints determined for other multi-block partitions of sequences.

11. A method according to claim 1, further comprising encoding an indication of the location of the selected single breakpoint according to a breakpoint variable length coding method, and wherein the breakpoint variable length coding method used to encode the indication of the location of the selected single breakpoint depends on whether or nor there are any one or more sequences that have only zero-valued quantized coefficients corresponding to one or more blocks in the multi-block partition.

12. A method according to claim 11, including using a different breakpoint variable length coding method according to the number of sequences having non-zero-valued coefficients in the multi-block partition.

13. A method as recited in claim 1, wherein the selected low-frequency coding method includes one-dimensional position and one-dimensional amplitude coding.

14. A method as recited in claim 1, wherein the selected low-frequency coding method includes two-dimensional position and one-dimensional amplitude coding.

15. A method as recited in claim 1, wherein the selected low-frequency coding method includes integrated position and amplitude coding.

16. A method as recited in claim 1, wherein the selected low-frequency coding method includes two-dimensional position and multi-dimensional amplitude coding.

17. A method as recited in claim 1, wherein the selected low-frequency coding method includes integrated position and amplitude coding with low valued amplitude and low number of clusters coding.

18. An apparatus comprising:
a programmable processing system that includes one or more processors and a storage subsystem including a memory, the storage subsystem including instructions that when executed by the processing system, cause the processing system to carry out a method comprising:
(I) dividing an image into blocks of image data forming a plurality of multi-block partitions by grouping adjacent blocks; and
(II) for each multi-block partition:
(a) for each ordered sequence of quantized transform coefficients of respective blocks of image data in the multi-block partition, determining a respective set of possible breakpoints, each possible breakpoint indicating an ending event recognized by a selected low-frequency coding method that includes recognizing any event that includes a cluster of one or more quantized coefficients having amplitudes other than the most likely-to-occur amplitude, and for each possible breakpoint, determining the number of bits to encode the ordered sequence of quantized transform coefficients of the block using a hybrid coding method that includes using the selected low-frequency coding method until the ending event and a selected high-frequency coding method to encode a part of the sequence starting from immediately after the ending event;
(b) determining a set of potential breakpoints to use for all blocks in the multi-block partition, wherein each potential breakpoint is one of the possible breakpoints of the sets of breakpoints determined in (a) for the respective sequences of the blocks in the multi-block partition, and for each potential breakpoint, determining the sum of the total number of bits to encode all the ordered sequences of quantized transform coefficients of the blocks in the multi-block partition using the hybrid coding method with the ending event indicated by the potential breakpoint;
(c) comparing the total numbers of bits to encode all the ordered sequences of quantized transform coefficients of the blocks in the multi-block partition using the hybrid coding method with the ending events indicated by the potential breakpoints of the set determined in (b), and selecting as the single breakpoint the one potential breakpoint of the set determined in (b) that gives the minimum total number of bits; and
(d) encoding all the sequences of the blocks in the multi-block partition using the hybrid coding method with the ending event indicated by the selected single breakpoint, including for each sequence encoding a first portion of the sequence up to the ending event using the selected low-frequency coding method and a second portion of the sequence from the first coefficient after the ending event to the end of the sequence using the selected high-frequency coding method.

19. A computer-readable hardware storage medium storing computer-executable instructions that when executed cause carrying out a method comprising:
(I) dividing an image into blocks of image data forming a plurality of multi-block partitions by grouping adjacent blocks; and
(II) for each multi-block partition:
(a) for each ordered sequence of quantized transform coefficients of respective blocks of image data in the multi-block partition, determining a respective set of possible breakpoints, each possible breakpoint indicating an ending event recognized by a selected low-frequency coding method that includes recognizing any event that includes a cluster of one or more quantized coefficients having amplitudes other than the most likely-to-occur amplitude, and for each possible breakpoint, determining the number of bits to encode the ordered sequence of quantized transform coefficients of the block using a hybrid coding method that includes using the selected low-frequency coding method until the ending event and a selected high-frequency coding method to encode a part of the sequence starting from immediately after the ending event;
(b) determining a set of potential breakpoints to use for all blocks in the multi-block partition, wherein each potential breakpoint is one of the possible breakpoints of the sets of breakpoints determined in (a) for the respective sequences of the blocks in the multi-block partition, and for each potential breakpoint, determining the sum of the total number of bits to encode all the ordered sequences of quantized transform coefficients of the blocks in the multi-block partition using the hybrid coding method with the ending event indicated by the potential breakpoint;
(c) comparing the total numbers of bits to encode all the ordered sequences of quantized transform coefficients of the blocks in the multi-block partition using the hybrid coding method with the ending events indicated by the potential breakpoints of the set determined in (b), and selecting as the single breakpoint the one potential breakpoint of the set determined in (b) that gives the minimum total number of bits; and
(d) encoding all the sequences of the blocks in the multi-block partition using the hybrid coding method with the ending event indicated by the selected single breakpoint, including for each sequence encoding a first portion of the sequence up to the ending event using the selected low-frequency coding method and a second portion of the sequence from the first coefficient after the ending event to the end of the sequence using the selected high-frequency coding method.

20. A computer-readable hardware storage medium as recited in claim 19, wherein the quantized transform coefficients are such that 0 is the most likely to occur amplitude, and 1 is the next to most likely to occur amplitude.

21. A computer-readable hardware storage medium as recited in claim 19, wherein the instructions when executed is further operable to encode the location of the final ending event.

22. A method of decoding comprising:
accepting a bitstream that includes codewords encoded by a coding method, the coding method including:
(I) dividing an image into blocks of image data forming a plurality of multi-block partitions by grouping adjacent blocks; and
(II) for each multi-block partition:
(a) for each ordered sequence of quantized transform coefficients of respective blocks of image data in the multi-block partition, determining a respective set of possible breakpoints, each possible breakpoint being indicating an ending event recognized by a selected low-frequency coding method that includes recognizing any event that includes a cluster of one or more quantized coefficients having amplitudes other than the most likely-to-occur amplitude, and for each possible breakpoint, determining number of bits to encode the ordered sequence of quantized transform coefficients of the block using a hybrid coding method that includes using the selected low-frequency coding method until the ending event and a selected high-frequency coding method to encode a part of the sequence starting from immediately after the ending event;
(b) determining a set of potential breakpoints to use for all blocks in the multi-block partition, wherein each potential breakpoint is one of the possible breakpoints of the sets of breakpoints determined in (a) for the respective sequences of the blocks in the multi-block partition, and for each potential breakpoint, determining the sum of the total number of bits to encode all the ordered sequences of quantized transform coefficients of the blocks in the multi-block partition using the hybrid coding method with the ending event indicated by the potential breakpoint;

(c) comparing the total numbers of bits to encode all the ordered sequences of quantized transform coefficients of the blocks in the multi-block partition using the hybrid coding method with the ending events indicated by the potential breakpoints of the set determined in (b), and selecting as the single breakpoint the one potential breakpoint of the set determined in (b) that gives the minimum total number of bits;

(d) encoding all the sequences of the blocks in the multi-block partition using the hybrid coding method with the ending event indicated by the selected single breakpoint, including for each sequence encoding a first portion of the sequence up to the ending event using the selected low-frequency coding method and a second portion of the sequence from the first coefficient after the ending event to the end of the sequence using the selected high-frequency coding method; and (e) encoding an indication of the location of the selected single breakpoint;

recognizing codewords in the bitstream; and decoding the recognized codewords.

23. A computer-readable hardware storage medium storing computer-executable instructions that when executed cause carrying out a method comprising:

accepting a bitstream that includes codewords encoded by a coding method, the coding method including:

(I) dividing an image into blocks of image data forming a plurality of multi-block partitions by grouping adjacent blocks; and (II) for each multi-block partition:

(a) for each ordered sequence of quantized transform coefficients of respective blocks of image data in the multi-block partition, determining a respective set of possible breakpoints, each possible breakpoint indicating an ending event recognized by a selected low-frequency coding method that includes recognizing any event that includes a cluster of one or more quantized coefficients having amplitudes other than the most likely-to-occur amplitude, and for each possible breakpoint, determining number of bits to encode the ordered sequence of quantized transform coefficients of the block using a hybrid coding method that includes using the selected low-frequency coding method until the ending event and a selected high-frequency coding method to encode a part of the sequence starting from immediately after the ending event;

(b) determining a set of potential breakpoints to use for all blocks in the multi-block partition, wherein each potential breakpoint is one of the possible breakpoints of the sets of breakpoints determined in (a) for the respective sequences of the blocks in the multi-block partition, and for each potential breakpoint, determining the sum of the number of bits to encode all the ordered sequences of quantized transform coefficients of the respective blocks in the multi-block partition using the potential breakpoint;

(c) comparing the total numbers of bits to encode all the ordered sequences of quantized transform coefficients of the blocks in the multi-block partition using the hybrid coding method with the ending events indicated by the potential breakpoints of the set determined in (b), and selecting as the single breakpoint the one potential breakpoint of the set determined in (b) that gives the minimum total number of bits;

(d) encoding all the sequences of the blocks in the multi-block partition using the hybrid coding method with the ending event indicated by the selected single breakpoint, including for each sequence encoding a first portion of the sequence up to the ending event using the selected low-frequency coding method and a second portion of the sequence from the first coefficient after the ending event to the end of the sequence using the selected high-frequency coding method; and (e) encoding an indication of the location of the selected single breakpoint;

recognizing codewords in the bitstream; and decoding the recognized codewords.

* * * * *

UNITED STATES PATENT AND TRADEMARK OFFICE
CERTIFICATE OF CORRECTION

| | | |
|---|---|---|
| PATENT NO. | : 8,126,062 B2 | |
| APPLICATION NO. | : 11/686860 | |
| DATED | : February 28, 2012 | |
| INVENTOR(S) | : Tian et al. | |

It is certified that error appears in the above-identified patent and that said Letters Patent is hereby corrected as shown below:

In Column 30, line 45, after "each possible break-point" and before "indicating an ending event", kindly delete "being".

Signed and Sealed this
Seventeenth Day of April, 2012

David J. Kappos
*Director of the United States Patent and Trademark Office*